(12) United States Patent
Roark et al.

(10) Patent No.: US 11,551,544 B2
(45) Date of Patent: Jan. 10, 2023

(54) IMPEDING UNAUTHORIZED NETWORK INFILTRATION AT REMOTE CRITICAL INFRASTRUCTURE FACILITIES

(71) Applicant: Inventus Holdings, LLC, Juno Beach, FL (US)

(72) Inventors: Frank L Roark, Boca Raton, FL (US); Joshua W Roark, West Palm Beach, FL (US); Jason R Chentorycki, Palm Beach Gardens, FL (US); Carmine A Priore, III, Wellington, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 473 days.

(21) Appl. No.: 16/773,426

(22) Filed: Jan. 27, 2020

(65) Prior Publication Data
US 2021/0233383 A1 Jul. 29, 2021

(51) Int. Cl.
| | | |
|---|---|---|
| *G08B 25/08* | (2006.01) | |
| *H04L 49/35* | (2022.01) | |
| *H04W 88/04* | (2009.01) | |
| *H04L 9/32* | (2006.01) | |
| *G08B 13/08* | (2006.01) | |
| *G07C 9/00* | (2020.01) | |

(Continued)

(52) U.S. Cl.
CPC ............ *G08B 25/08* (2013.01); *G05B 19/05* (2013.01); *G07C 9/00174* (2013.01); *G08B 13/08* (2013.01); *H04L 9/3226* (2013.01); *H04L 49/35* (2013.01); *H04L 67/01* (2022.05); *H04W 88/04* (2013.01); *G07C 2009/00976* (2013.01)

(58) Field of Classification Search
None
See application file for complete search history.

(56) References Cited

U.S. PATENT DOCUMENTS

| | | | |
|---|---|---|---|
| 7,496,961 B2 | 2/2009 | Zimmer et al. | |
| 9,311,499 B2 | 4/2016 | Redlich et al. | |
| 9,948,495 B2 * | 4/2018 | McKinstry | ............. H04L 41/00 |

(Continued)

FOREIGN PATENT DOCUMENTS

| | | | | |
|---|---|---|---|---|
| CA | 2896561 A1 * | 5/2014 | ............. | F03D 1/02 |
| CN | 110164029 A * | 8/2019 | | |

(Continued)

*Primary Examiner* — Fekadeselassie Girma
(74) *Attorney, Agent, or Firm* — Tarolli, Sundheim, Covell & Tummino LLP (57) ABSTRACT

A system for preventing unauthorized access to a network can include a secure container having an access portal for controlling access to contents of the secure container and a security checkpoint configured to determine a state of the access portal and to receive an authorization code for opening the access portal. The security checkpoint can also include a logical lock module that switches to a breach mode of operation in response to a signal from the security checkpoint indicating that the access portal has been opened without receipt of the authorization code within a predetermined amount of time. The system can also include a network switch disposed within the secure container. The network switch is configured to communicate on a network and disable outgoing network communications to the network in response to a breach signal indicating that the logical lock module has switched to the breach mode.

20 Claims, 4 Drawing Sheets

(51) Int. Cl.
 G05B 19/05 (2006.01)
 H04L 67/01 (2022.01)

(56) References Cited

U.S. PATENT DOCUMENTS

| | | | |
|---|---|---|---|
| 2006/0038688 A1* | 2/2006 | Nakamura | G06Q 10/063 |
| | | | 340/522 |
| 2010/0306544 A1 | 12/2010 | Lionetti et al. | |
| 2015/0254948 A1 | 9/2015 | Acosta | |
| 2021/0233383 A1* | 7/2021 | Roark | H04L 9/3226 |
| 2021/0294287 A1* | 9/2021 | Valin | H02S 10/10 |

FOREIGN PATENT DOCUMENTS

| | | | | |
|---|---|---|---|---|
| CN | 110164032 A | * | 8/2019 | |
| EP | 1617619 B1 | | 5/2007 | |
| EP | 1806703 A2 | * | 7/2007 | G07C 9/00309 |
| JP | 2005296036 A | * | 10/2005 | |

* cited by examiner

FIG. 4

IMPEDING UNAUTHORIZED NETWORK INFILTRATION AT REMOTE CRITICAL INFRASTRUCTURE FACILITIES

TECHNICAL FIELD

This disclosure relates generally to security systems. More particularly, this disclosure relates to a security system with a secure container such as a wind turbine or electric power grid substation to prevent unauthorized access to a network.

BACKGROUND

A network switch (also called a switching hub, bridging hub, officially media access control (MAC) bridge) is networking hardware that connects devices on a computer network by using packet switching to receive, and forward data to the destination device. A network switch can be implemented as a multiport network bridge that uses MAC addresses to forward data at the data link layer (layer 2) and/or the network layer (layer 3) of the Open Systems Interconnect (OSI) reference model. In the electric power grid, such switches can facilitate Critical Infrastructure network access in remotely located and generally unmanned facilities such as substations or wind turbines.

A magnetic reed switch (or simply a reed switch) is an electrical switch operated by an applied magnetic field. In the simplest and most common form, a magnetic reed switch has of a pair of ferromagnetic flexible metal contacts in a hermetically sealed glass envelope. The contacts are usually normally open, closing when a magnetic field is present, or they may be normally closed and open when a magnetic field is applied. The switch may be actuated by an electromagnetic coil, making a reed relay, or by bringing a permanent magnet near the magnetic reed switch. When the magnetic field is removed, the contacts in the reed switch return to their original position. A magnetic reed switch can be employed to detect the opening of a door, when used as a proximity switch for a security alarm.

An electronic lock (or electric lock) is a locking device that is actuated with electric current. Electronic locks are sometimes stand-alone with an electronic control assembly mounted directly to the lock. Electronic locks may be connected to an access control system, the advantages of which include: key control, where keys can be added and removed without re-keying the lock cylinder; fine access control, where time and place are factors; and transaction logging, where activity is recorded. Electronic locks can also be remotely monitored and controlled, both to lock and to unlock.

An electromagnetic lock, magnetic lock or maglock is a type of electronic lock, and more particularly, a locking device that include an electromagnet and an armature plate. Maglocks can be either "fail safe" or "fail secure". A fail-secure locking device remains locked when power is lost. Fail-safe locking devices are unlocked when de-energized. Typically the electromagnet portion of the lock is attached to the door frame and a mating armature plate is attached to the door. The two components are in contact when the door is closed. When the electromagnet is energized, a current passing through the electromagnet creates a magnetic flux that causes the armature plate to attract to the electromagnet, creating a locking action. Because the mating area of the electromagnet and armature is relatively large, the force created by the magnetic flux is strong enough to keep the door locked even under stress.

SUMMARY

One example relates to a system for preventing unauthorized access to a network. The system can include a secure container having an access portal for controlling access to contents of the secure container and a security checkpoint configured to determine a state of the access portal and to receive an authorization code for opening the access portal. The secure container can also include a logical lock module that switches to a breach mode of operation in response to a signal from the security checkpoint indicating that the access portal has been opened without receipt of the authorization code within a predetermined amount of time. The system can also include a network switch disposed within the secure container. The network switch is configured to communicate on a network and disable outgoing network communications to the network in response to a breach signal indicating that the logical lock module has switched to the breach mode. The system can further include a terminal device disposed within the secure container, the terminal device communicating on the network through the network switch.

Another example relates to a system preventing unauthorized access to a network. The system can include a plurality of secure containers, each secure container can include an access portal for controlling access to contents of the respective secure container and a security checkpoint configured to receive an authorization code for access to the contents of the respective secure container and to determine a state of the access portal for the respective container. Each secure container can also include a logical lock module that switches to a breach mode of operation in response to a signal from the security checkpoint indicating that the access portal has been opened without receipt of the authorization code within a predetermined amount time before or after opening the access portal. The system can also include a plurality of network switches, each network switch being disposed within a respective secure container, wherein each network switch is configured to communicate on a network and disable outgoing network communications to the network in response to a breach signal indicating that a respective logical lock module has switched to the breach mode. The system can further include a plurality of terminal devices, wherein each terminal device is disposed within a respective secure container, and each terminal device communicates on the network through a respective network switch.

Yet another example relates to a method for impeding infiltration of a network. The method can include determining, by a logical lock module, that an access portal of a secure container has been opened without entry of an authorization code in response to a signal from a security checkpoint. The method can also include disabling, by a network switch disposed within the secure container, outgoing network traffic to a network in response to a breach signal indicating that the access portal has been opened without entry of the authorization code, wherein a terminal device is coupled to the network switch.

DETAILED DESCRIPTION

This disclosure relates to a system with a secure container that disables outgoing network communication (e.g., outgoing network traffic) on ports of a network switch in response to a physical breach of the secure container. The secure container, such as a control panel, a wind turbine or an electrical substation includes a security checkpoint (e.g., a keypad or a card reader) affixed to or in close proximity with an access portal (e.g., a door) allowing a user to enter an authorization code (e.g., a keycode) or to hold a keycard near the security checkpoint. Additionally, the security checkpoint can include and/or receive a signal from a sensor or other component to monitor a state of the access portal (e.g., opened or closed). If the access portal is opened, the contents of the secure container are accessible.

Additionally, the security checkpoint can send the authorization code and a state of the access portal (e.g., opened or closed) to a logical lock module that can determine if the access portal is permitted to be opened or if a breach has occurred. More specifically, in response to the signals from the security checkpoint, the logical lock module can determine if the access portal is open within a predetermined amount of time (e.g., one minute) before or after opening the access portal. In some examples, the logical lock module can be integrated with the network switch of the security checkpoint. In other examples, the logical lock module can be a separate entity and/or integrated with an electronic lock, such as a maglock.

In some examples, the logical lock module includes logic for providing a breach signal to the network switch in response to detecting that the access portal has been open without entry of an authorization code (e.g., the access portal has been forced opened or otherwise opened without entry of the authorization code). In other examples, in response to detecting that the access portal has been opened without entry of the authorization code, the logical lock module provides an unauthorized entry signal to a server (e.g., a security server) and in response, the security server provides the breach signal to the network switch. The breach signal indicates that the contents of the container are be impermissibly accessed. In response to the breach signal, the network switch can disable the outgoing network traffic on communication ports of the network switch to prevent an unauthorized user (e.g., a hacker and/or a terrorist) from infiltrating a network upstream of the switch which may be a network incorporated in American Critical Infrastructure, such as the electric power grid.

As one example, the container can be implemented as a control panel for a wind turbine in a windfarm. In such an example, the security checkpoint can be implemented as a keypad and a magnet reed switch (a sensor) to determine if a door (e.g., an access portal) of the control panel is opened or closed. The control panel can store a controller (e.g., programmable logic controller) for the wind turbine, a computer terminal and a network switch for communicating with other nodes on a network (e.g., components of other access panels in the windfarm). Accordingly, if an unauthorized user (e.g., a hacker and/or a terrorist) were to gain unrestricted access to the control panel, the unauthorized user may gain access to other nodes on the network. To prevent such unauthorized access, the logical lock module can include logic that outputs a breach signal to the network switch in response to detecting that the door of the control panel (e.g., an access portal) had been opened without proper authentication (e.g., without entry of an authorization code on the keypad). In response, the network switch disables outgoing communication on the communication ports of the network switch, thereby thwarting and/or impeding the unauthorized user's efforts to gain access to the network.

In another example, the secure container can be used to house mobile devices (e.g., tablet computers) that may have access to private data on a server (e.g., such as in a medical facility or a retail facility). In this situation, each mobile device can communicate with a wireless network switch assigned to (and possibly housed in) the secure container. Additionally, an electronic lock can be implemented as a maglock on the secure container, and the security checkpoint can be implemented with a card reader and a sensor for monitoring the status of an access portal (e.g., door). In response to detecting that the access portal (e.g., a door) to the secure container has been opened without authorization, the logical lock module can provide a breach signal to the wireless network switch. In response to the breach signal, the wireless network switch can disable communication with each mobile device (identifiable by a media access control (MAC) address) and disable further communication with the server. Accordingly, attempts to access the server (and the private data stored thereon) by an unauthorized user are thwarted and/or impeded.

Figure 1:
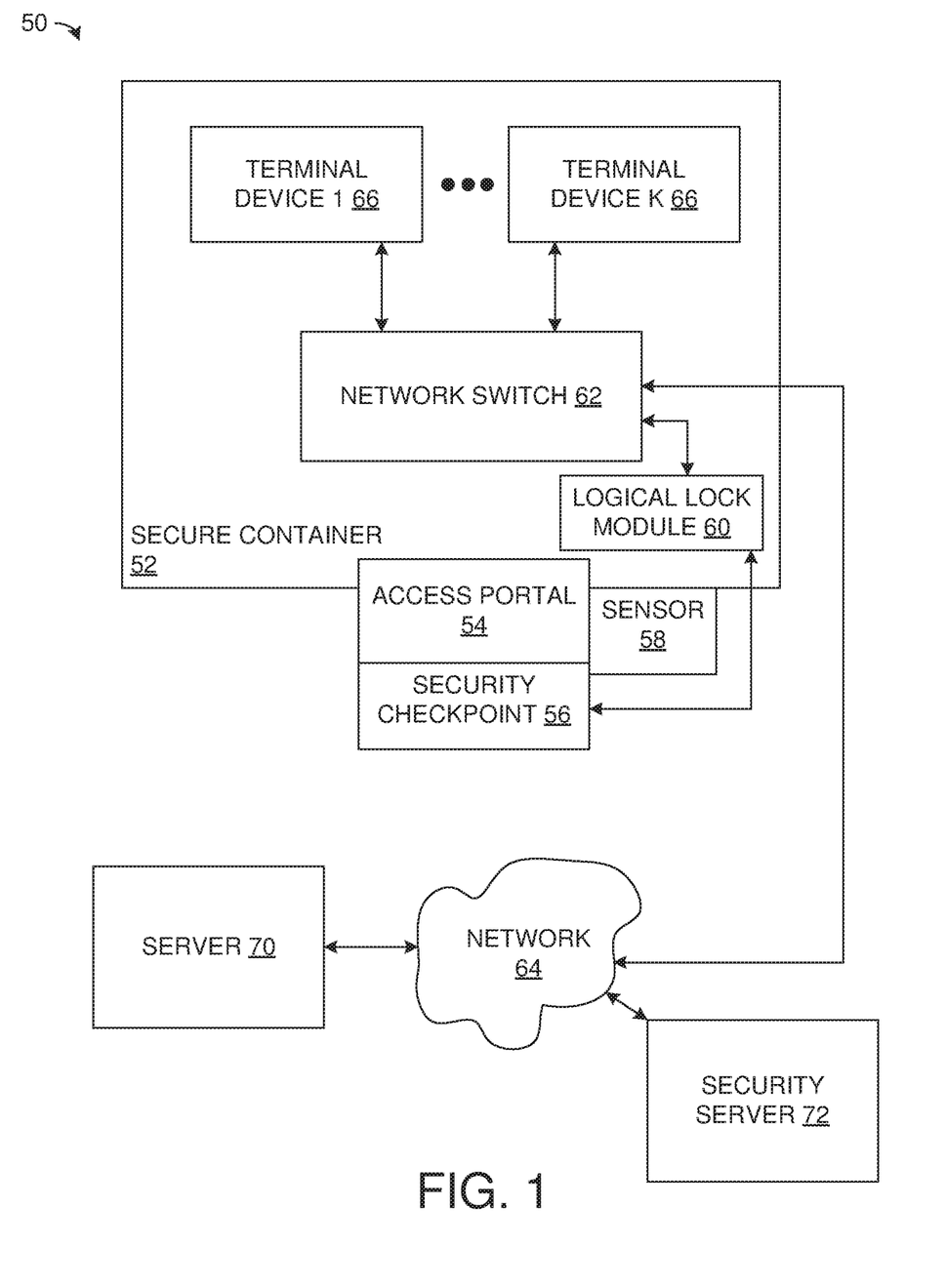
FIG. 1 illustrates a block diagram of an example of a system with a secure container for preventing unauthorized access to a network.

FIG. 1 illustrates a system 50 for controlling access to a secure container 52. As used herein, the term "secure container" denotes any enclosed structure that can protect the contents stored within the enclosed structure. As some examples, the secure container 52 can be a box (e.g., a control panel), an access panel, a cage or a secure facility (e.g., a secure office).

The secure container 52 can include an access portal 54. The access portal 54 provides a re-closable barrier that intermittently allows secure access to contents of the secure container 52 based on a state of the access portal (e.g., opened or closed). As some examples, the access portal 54 could be a door (e.g., a panel door). In other examples, the access portal 54 can be a window.

The state of the access portal 54 (e.g., opened or closed) can be monitored by a security checkpoint 56. The security checkpoint 56 can be implemented, for example, as a keypad or a card reader that receives an authorization code. The authorization code could be, for example, a code for entry on a keypad or an identification. Additionally, the security checkpoint 56 can monitor a state of the access portal 54. For example, the security checkpoint 56 can include and/or be in communication with a sensor 58 that can monitor a state of the access portal 54 (e.g., opened or closed). The sensor 61 can be implemented, for example, as a magnetic reed switch, a proximity switch, a laser and a photodetector, etc. The sensor 61 can provide a signal (e.g., a binary signal) indicating a state of the access portal 54. In situations where the access portal 54 is a window, the sensor 58 can provide a signal indicating whether the window is closed or opened (which may indicate that the window is broken). The security checkpoint 56 can include an embedded computing device (e.g., a controller and/or an application specific integrated circuit (IC) chip) for executing machine readable instructions. The security checkpoint 56 can be configured to provide a signal indicating a state of the access portal 54 and an authorization code (if provided) to a logical lock module 60.

A network switch 62 can be disposed within the confines of the secure container 52. The network switch 62 can be implemented as a network bridge for facilitating communication on a network 64 that is logically upstream from the network switch 62. The network switch 62 can be programmable to selectively enable or disable incoming and outgoing communications on each communication port. The network 64 can be a public network (e.g., the Internet), a private network (e.g., a local area network (LAN)) or a combination thereof (e.g., a virtual private network). K number of terminal devices 66 can be connected to communication ports of the network switch 62, where K is an integer greater than or equal to one. Each of the K number of terminal devices 66 can be implemented as a computing device that can communicate with nodes on the network 64. As an example, one of the K number of terminal devices 66 can be implemented as a general purpose computing device (e.g., a workstation computer, a desktop computer, a table computer, a smart phone, etc.). Additionally or alternatively, one of the K number of terminal devices 66 can be implemented as an industrial computing device (e.g., a programmable logic controller (PLC)). The network switch 62 can have two modes of operation, a normal mode and a breach mode. In the normal mode of operation, each of the K number of terminal devices 66 can communicate with nodes on the network 64 via the network switch 62. Thus, in the normal mode of operation, network traffic passing between the K number of terminal devices 66 and nodes on the network 64 passes through the network switch 62.

Communication between the K number of terminal devices 66 and the network switch 62 can be wired communications or wireless communications. For example, in some situations, the network switch 62 can be a wired network bridge, and some or all of the K number of terminal devices 66 can be coupled to the network switch 62 via a network cord. In another example, some or all of the K number of terminal devices 66 can be implemented as wireless network devices, wherein each such terminal device 66 establishes a wireless communication channel between the terminal device 66 and the network switch 62.

As one example, a server 70 can communicate with the K number of terminal devices 66 (or some subset thereof) via the network switch 62. For instance, in one example, the secure container 52 can be employed as a control panel for a power generation station (e.g., a wind turbine control panel). In such a situation, the server 70 can provide control commands to a terminal device 66 implemented as a PLC. As another example, the secure container 52 can be implemented in a medical office or a retail facility, and the server 70 can store secure information, such as patient medical records or financial information. In such a situation, each of the K number of terminal device 66 can be implemented as tablet computers for entry of patient information for medical records that can be securely stored in the server 70.

In some examples, the logical lock module 60 can be implemented as a hardware (e.g., machine executable instructions embedded on an integrated circuit (IC) chip. In other examples, the logical lock module can be implemented a software module (e.g., machine readable instructions) that is stored in a non-transitory memory and executed by a processing unit (e.g., one or more processor cores). In some examples, the logical lock module 60 can be integrated with the security checkpoint 56. In other examples, the logical lock module 60 can be integrated with the network switch 62. In still other examples, the logical lock module 60 can be integrated with another device (e.g., an electronic lock) or be implemented as a stand-alone structure, such as a node on the network 64 that communicates through the network switch 62. In yet other examples, the logical lock module 60 can communicate on the network 64 without going through the network switch 62. In yet other examples, the logical lock module 60 is a stand-alone structure that is not a node on the network 64.

The secure container 52 can be configured to prevent an unauthorized user (e.g., a hacker or a terrorist) from gaining access to a terminal device 66 and exploiting security holes to access other nodes on the network 64, such as, but not limited to the server 70. In particular, security checkpoint 56 and the logical lock module 60 can operate in concert with the network switch 62 to prevent (at least) outgoing communication from any of the terminal devices 66 in response to a a breach of the access portal 54.

In the authorized mode, the logical lock module 60 allows the access portal 54 to be opened or closed freely. Additionally, in the normal mode, the logical lock module 60 disallows opening of the access portal 54 unless the authorization code is provided. Furthermore, as noted, the logical lock module 60 has a breach mode which indicates that the logical lock module 60 has received signaling from the security checkpoint 56 indicating the access portal 54 being forced opened without entry of the authorization code. As an example, sensor 58 is damaged or otherwise disengaged from the access portal 54 without entry of the authorization code into the security checkpoint 56, the security checkpoint 56 provides signaling indicating the status of the access portal 54 (e.g., opened), but no signal indicating that the authorization code has been entered within a predetermined amount of time (e.g., one minute or less), the logical lock module 60 changes to the breach mode. In another example, such a situation where logical lock module 60 is implemented on a maglock, if the maglock is forced open by separating an armature plate from an electromagnet (thereby opening the access portal 54) without entry of the authorization code into the security checkpoint 56, the logical lock module 60 integrated with the maglock changes to the breach mode.

In a first example, (hereinafter, "the first example"), the logical lock module 60 can be implemented as a node on the network 64, such as an example where the logical lock module 60 is integrated with the security checkpoint 56 or the logical lock module 60 is a separate physical device. In the first example, in response to changing to the breach mode, the logical lock module 60 provides an unauthorized entry signal to a security server 72 via the network 64. Continuing with the first example, in response, the security server 72 can provide a breach signal to the network switch 62.

In a second example, (hereinafter, "the second example"), the logical lock module 60 can be wired to communicate directly with the network switch 62 or integrated in the network switch 62. In such a situation, the logical lock module 60 can be configured to provide a breach signal directly to the network switch 62 in response to the logical lock module 60 changing to the breach mode.

In either the first or second example, the network switch 62 receives the breach signal in response to an unauthorized opening of the access portal 54. In response to the breach signal, the network switch 62 can switch to a breach mode of operation, and disable outgoing communications to the network 64. More particularly, the network switch 62 can control communication ports to prevent network packets (network traffic) from flowing from a terminal device 66 to another node on the network 64. Additionally, in some examples, in the breach mode of operation, the network switch 62 can control the communication ports to prevent network packets from flowing into the terminal devices 66. Alternatively, in the breach mode of operation the network switch 62 can operate as a data diode that allows incoming network packets to be communicated from the network 64 to the terminal device 66 but prevents outgoing network packets from being transmitted to the network 64.

Further, in some examples, prior to disabling outgoing communications, in response to the breach mode of operation, the network switch 62 can broadcast a breach message (e.g., a "last gasp" message) to the server 70 and/or other nodes on the network 64. The breach message can indicate that the breach signal has been received, and that further communications from nodes downstream of the network switch 62 should not be trusted. Such nodes (including the terminal devices 66) can be identified with a MAC address and/or an Internet Protocol (IP) address. In other examples, the breach message can be broadcast by the security server 72 to other nodes the network (including the server 70) in response to an unauthorized entry signal.

The network switch 62 can continue to operate in the breach mode of operation until a security breach clearance code is received. In some examples, the security breach clearance code can be provided from the security server 72. In other examples, the security checkpoint 56 can include a secure cryptoprocessor, such as a trusted platform module (TPM) that can receive and decrypt an encrypted version of the security clearance code from the security server 72. In other examples, the security checkpoint 56 can include an asynchronous password token generator. In such a situation, entry of the asynchronous password, along with entry of the authorization code into the security checkpoint (e.g., a keypad) can cause the logical lock module 60 to provide the security breach clearance code to the network switch 62. In response to the security breach clearance code, the network switch 62 can return to the normal operating mode. Additionally, in response to the security breach clearance code, the logical lock module 60 can switch to the authorized mode of operation.

By implementing the system 50 with the secure container 52 described herein, in the event an unauthorized user (e.g., a hacker and/or a terrorist) physically breaches the barrier formed by the secure container 52 (e.g., forces the access portal 54 opened), the logical lock module 60 and the network switch 62 can mitigate the impact of the breach, impeding unauthorized network infiltration. In particular, the unauthorized user would be unable to employ any of the terminal devices 66 as points of ingress or egress to infiltrate nodes of the network 64. As noted, in some situations, one of the terminal devices 66 could be implemented as a PLC. In this situation, the PLC may have limited security software executing thereon. In other examples, one of the terminal devices 66 can be a general purpose computing system executing a legacy operating system (OS) with known security holes. However, upon breaching the access portal 54, the outgoing network traffic from such terminal device 66 is disabled, thereby thwarting and/or impeding efforts of the unauthorized user of unlawfully appropriating secure data on the network 64, such as data stored at the server 70.

Figure 2:
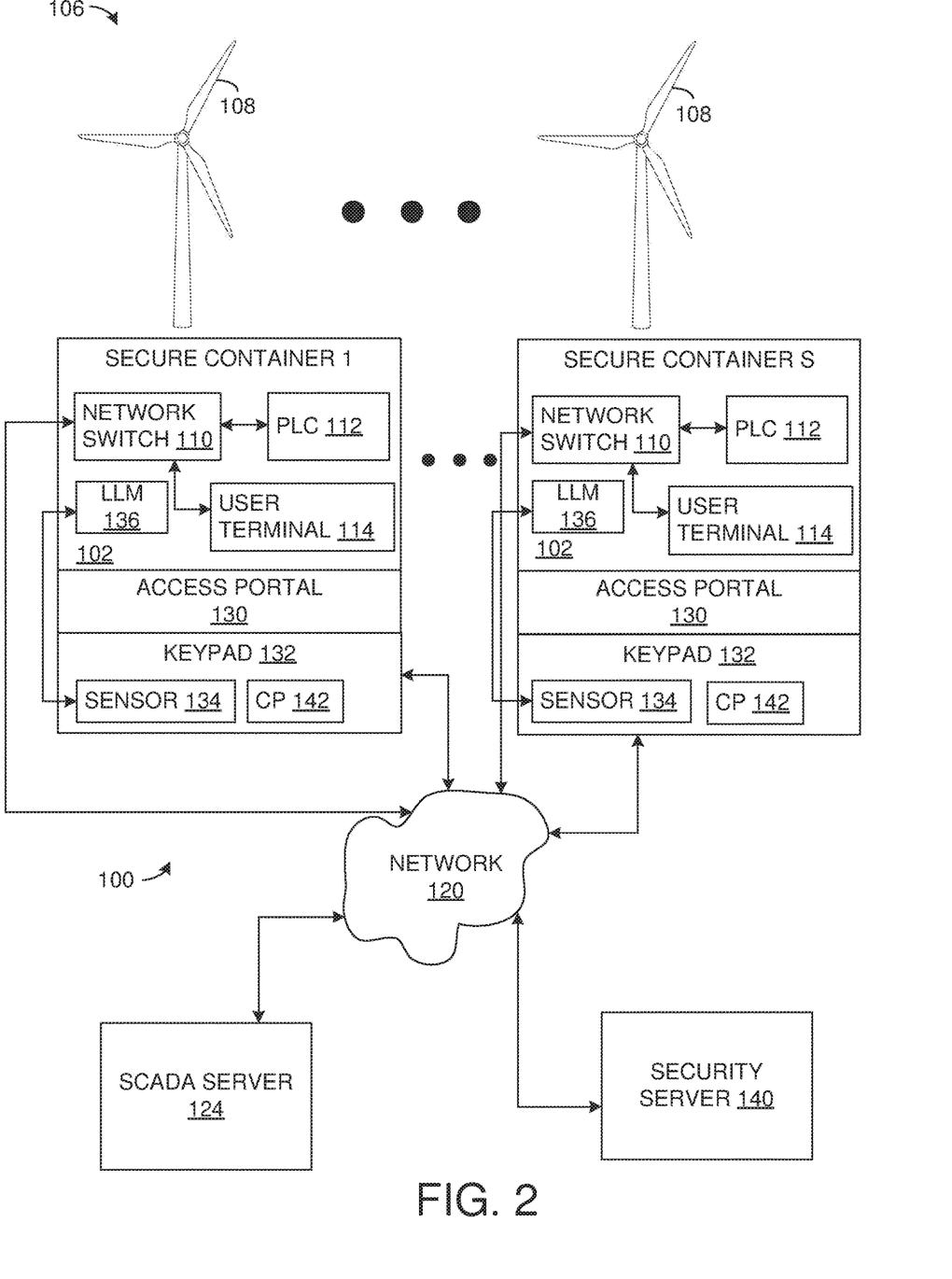
FIG. 2 illustrates a block diagram of an example of a system with a plurality of secure containers implemented on a windfarm to prevent unauthorized access to a network.

FIG. 2 illustrates an example of a system 100 with S number of secure containers 102 in a windfarm 106, wherein S is an integer greater than or equal to one. Each secure container 102 can be implemented as a control panel (e.g., an electrical box or access panel) with components electrically coupled to a corresponding wind turbine 108 of the windfarm 106, such that there are S number of wind turbines 108.

The system 100 can be employed to implement the system 50 of FIG. 1. Thus, each secure container 102 can be implemented as an instance of the secure container 52 of FIG. 1. Each secure container 102 can securely store a network switch 110 that can be employed to implement the network switch 62 of FIG. 1. Additionally, each secure container 102 can include a PLC 112 and a user terminal 114, each of which can be employed to implement an instance of the terminal device 66 of FIG. 1.

The network switch 110 can allow the PLC 112 and the user terminal 114 to communicate with nodes on a network 120, such as a utility network (e.g., a public or private network). The user terminal 114 can be representative of a computer terminal, such as a workstation, a desktop computer or a tablet computer. The user terminal 114 can execute an operating system (OS). The PLC 112 can control low level operations (e.g., industrial control signals) that are provided to a corresponding wind turbine 108. The user terminal 114 can be employed, for example, as a device to monitor operations of the corresponding wind turbine 108.

The network switch 110 includes two modes of operation, normal mode and breach mode. In the normal mode of operation, network traffic between nodes of the network 120 and the PLC 112 or the user terminal 114 flow through the network switch 110. In some examples, the PLC 112 and/or the user terminal 114 can receive commands from a Supervisory Control and Data Acquisition (SCADA) server 124 via the network 120 and the network switch 110.

Each of the S number of secure containers 102 can include an access portal 130. The access portal 130 can be, for example, a sealable door, that can be opened or closed. When the access portal 130 is opened, a user can physically access the contents of the corresponding secure container 102, including, but not limited to the enclosed network switch 110, the PLC 112 and the user terminal 114.

A keypad 132 can be affixed to the access portal 130. The keypad 132 can be employed to implement the security checkpoint 56 of FIG. 1. The keypad 132 can allow entry of a keycode (e.g., an authorization code) for access to the contents of the secure container 102. The keypad 132 can include or be in communication with a sensor, such as a magnetic reed switch or a proximity sensor that can monitor a state (opened or closed) of the access portal 130. Additionally, the keypad 132 can provide a signal indicating a state of the access portal (open or closed) along with the keycode code (if entered) to a logical lock module 136 (labeled LLM in FIG. 2). The logical lock module 136 can select a mode of operation based on the signal from the keypad 132. More particularly, logical lock module 136 can have three operating modes, normal mode, authorized mode and breach mode. In the normal mode of operation, the logical lock module 136 can determine that the access portal 130 is closed and is not authorized to be opened. In the authorized mode, the logical lock module 136 permits the access portal 130 to be opened or closed. The logical lock module 136 can operate in the normal mode and can be configured such that the logical lock module 136 can only be switched to the authorized mode in response to receipt of the keycode within a predetermined amount of time before or after opening of the access portal 130. In other examples, instead of the keypad 132, a card reader (not shown) could be used to provide an authorization code.

It is understood that in some examples, there may be additional physical security measures to prevent opening of the access portal 130. For example, in some situations, a mechanical keylock (not shown) can be installed on a secure container 102. Furthermore, in some such examples, the keypad 132 can be positioned within the confines of each secure container 102. In such a situation, the logical lock module 136 can be configured to switch to the authorized mode in response determining that the access portal 130 has been opened (e.g., unlocked) and within the predetermined amount of time (e.g., one minute or less) the logical lock module 136 receives an indication from the keypad 132 indicating that the authorization code is received.

The logical lock module 136 can also be configured to switch to the breached mode in response to receiving an indication from the keypad 132 that access portal 130 has been forced open without receipt of the keycode within the predetermined amount of time, thereby indicating that the secure container 102 has been breached.

In some examples, in response to a given logical lock module 136 switching to the breach mode, the given logical lock module 136 can provide a breach signal to the associated network switch 110. For instance, the given logical lock module 136 can be integrated with the keypad 132, which can be hard-wired to the network switch 110, and the breach signal can be provided over the wiring between the keypad 132 and the network switch 110.

In other examples, the logical lock module 136 can provide an unauthorized entry signal to a security server 140 operating as a node on the network 120 indicating that the access portal 130 has been opened without authorization. In response to the unauthorized entry signal, the security server 140 can provide the breach signal to the network switch 110.

In still other examples, the logical lock module 136 be integrated with the network switch 110, and the network switch 110 can receive the breach signal from an internal component (e.g., a software module) indicating that the access portal 130 has been opened without authorization.

In response to receipt of the breach signal (provided from the associated keypad 132, from the security server 140 or generated from an internal software module that includes the logical lock module 136) the network switch 110 switches from the normal mode to the breach mode. In the breach mode, the network switch 110 disables outgoing network traffic on communication ports, such that the network switch 110 prevents the PLC 112 and the user terminal 114 from outputting network traffic on the network 120. Additionally, in some examples, in the breach mode of operation, the network switch 110 also prevents network traffic from flowing from the network 120 into communication ports coupled to the PLC 112 and the user terminal 114. Alternatively, in some examples, in the breach mode of operation the network switch 110 operates as a data diode, such that the network switch 110 allows incoming network traffic (e.g., packets from the network 120 destined for the PLC 112 and/or the user terminal 114), but prevents outgoing traffic to network 120 (e.g., packets from the PLC 112 and/or the user terminal 114).

Each logical lock module 136 is configured to continue to operate in the breach mode until an indication that a security breach clearance code is received. In some examples, the keypad 132 can include a cryptoprocessor (CP) 142 that can receive the security breach clearance code from the security server 140 (or another entity). In other examples, the cryptoprocessor 142 of a keypad 132 can be employed as an asynchronous password token generator to generate a time synchronized asynchronous password. In such a situation, entry of the keycode and the time synchronized password on the keypad 132 can cause keypad 132 to provide signaling to the logical lock module 136 indicating that the security clearance code has been received, causing the logical lock module 136 to switch to the authorized mode. Additionally, the logical lock module 136 can provide a notice that the security clearance code has been received to the corresponding network switch 110. In response, the corresponding network switch 110 can switch to the normal mode of operation.

The system 100 can thwart and/or imped attempts by an unauthorized user (e.g., a hacker and/or a terrorist) to infiltrate the network 120. The windfarm 106 may be in a relatively remote location, and during normal operations, may not have a security guard in close proximity. Accordingly, in situations where the unauthorized user forces a given access portal 130 of a given secure container 102 open, authorities (e.g., police) may not arrive for thirty (30) minutes or more.

Through employment of the secure container 102 for the system 100, harmful acts caused by access to the contents of the given secure container (e.g., a PLC 112 and/or a user terminal 114) is confined to the given secure container 102. For example, in a situation where the unauthorized user (e.g., a hacker and/or terrorist) forces open the given access portal 130 of the given secure container 102 without entry of the authorization code (e.g., a keycode), the logical lock module 136 switches from the normal mode of operation to the breach mode of operation. Additionally, a network switch 110 within the given secure container 102 receives a breach signal, and the network switch 110 switches to the breach mode of operation. As discussed, in the breach mode, the network switch 110 disables outgoing network traffic, such that the PLC 112 and the user terminal 114 within the given secure container 102 are not permitted to send network traffic on the network 120. In this manner, the unauthorized user is prevented from attacking other components associated with other wind turbines 108 and/or servers on the network 120, such as the SCADA server 124 and the security server 140. In this manner, whatever harm the unauthorized user inflicts is localized to components within the given secure container 102.

Figure 3:
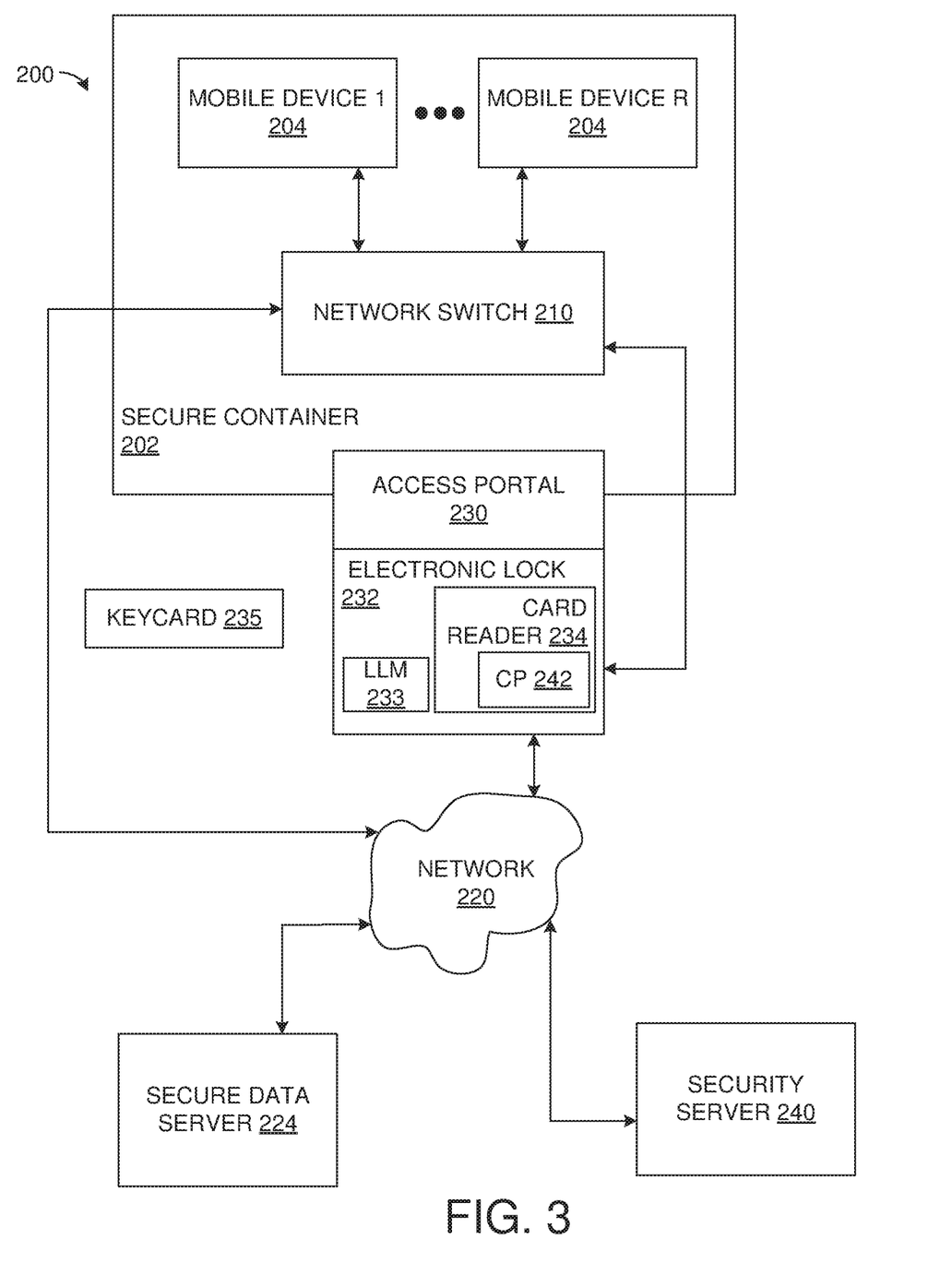
FIG. 3 illustrates an example of a system with a secure container storing a plurality of mobile devices configured to prevent unauthorized access to a network.

FIG. 3 illustrates an example of a system 200 with a secure container 202 that contains R number of mobile devices 204, where R is an integer greater than or equal to one. The system 200 could represent, for example, a medical facility or a retail location. In the example illustrated, each mobile device 204 within the secure container 202 can be employed for receipt of private data, such as medical or financial data. In such a situation, the secure container 202 can be implemented as a cage or room (e.g., a closet), and each mobile device 204 can be distributed to members of the general public on a temporary basis. For example, in a situation where the system 200 represents a medical facility, each mobile device 204 could be representative of a tablet computer that can be temporarily handed to patients (or family members), wherein the mobile device 204 is employed to receive medical data about patients. Alternatively, in situations where system 200 represents a retail facility (e.g., an automobile dealership or a retail merchant), each mobile device 204 can be representative of a tablet computer that can be temporarily handed to potential customers, wherein the mobile device 204 is employed to receive financial data about the potential customers (e.g., for a credit report).

The system 200 can be employed to implement the system 50 of FIG. 1. Thus, the secure container 202 can be implemented as an instance of the secure container 52 of FIG. 1. The secure container 202 can securely store a network switch 210 that can be employed to implement the network switch 62 of FIG. 1. Additionally, each of the R number of mobile devices 204 can wirelessly communicate with the network switch 210 via a secure channel (e.g., over a secure Wi-Fi connection). Additionally, in the example illustrated, the network switch 210 is physically located within the confines of the secure container 202. However, in other examples, the network switch 210 may be external to the secure container 202.

The network switch 210 can be employed to allow components within the secure container 202 (e.g., the mobile devices 204) to communicate with nodes on a network 220, such as a subnet of a public network (e.g., an intranet of the Internet and/or a virtual private network). In some examples, a secure data server 224 can receive and consume private data entered into the R number of mobile devices 204. In such a situation, a secure communication channel is established between a secure data server 224 and a given mobile device 204. This secure communication channel may traverse multiple mediums, including air and/or wires.

The network switch 210 includes two modes of operation, normal mode and breach mode. In the normal mode of operation, network traffic between nodes of the network 220 and the mobile device 204 flows through the network switch 210. In some examples, the mobile devices 204 can receive private information (e.g., patient records or financial data) from the secure data server 224 via the secure channel.

The secure containers 202 can include an access portal 230. The access portal 230 can be, for example, a sealable door, that can be opened or closed. When the access portal 230 is opened, a user can physically access the contents of the secure container 202, including, but not limited to the network switch 210 and the R number of mobile devices 204.

In the example illustrated in FIG. 3, an electronic lock 232, such as a maglock can be affixed to the access portal 230. A logical lock module 233 and a card reader 234 can be integrated with the electronic lock 232. The logical lock module 233 can be employed to implement the logical lock module 60 of FIG. 1 and the card reader 234 can be employed to implement the security checkpoint 56 of FIG. 1. The logical lock module 233 of the electronic lock 232 can have three operating modes, normal mode, authorized mode and breach mode. In the normal mode of operation, the electronic lock 232 can prevent opening of the access portal 230. In the authorized mode of operation, the electronic lock 232 allows the access portal 230 to be opened or closed. The card reader 234 can be affixed to the electronic lock 232 or spaced apart. The card reader 234 can communicate with a keycard 235 that can be held in close proximity to the card reader 234. In response to holding the keycard 235 in close proximity to the card reader 234, the card reader 234 can provide an identification code (e.g., an authorization code) to a security server 240 via the network 220. In response, if the identification code is associated with a user authorized to access the secure container 202, the security server 240 can send an unlock command to the logical lock module 232 (or the card reader 234). In response to the unlock command, the logical lock module 233 of the electronic lock 232 232 can switch to the authorized mode of operation. Stated differently, the logical lock module 232 can operate in the normal mode, wherein the electronic lock 232 is locked and can be configured such that the electronic lock 232 can only be released when the logical lock module 233 switches to authorized mode in response to the unlock command, which in turn is provided in response to the identification code (e.g., the authorization code). Additionally or alternatively, in some examples, other types of security checkpoints (e.g., keypads, fingerprint scanners, etc.) can be employed.

The logical lock module 233 can also be configured to switch to the breach mode in response a signal from the electronic lock 232 to detecting that the access portal 230 has been forced open without identification code (or other authorization code) being provided to the card reader 234, indicating that the secure container 202 has been breached. In some examples, in response to the logical lock module 233 switching to the breach mode, the logical lock module 233 can provide a breach signal to the associated network switch 210. For instance, the electronic lock 232 can be hard-wired to the network switch 210, and the breach signal can be provided over the wiring between the electronic lock 232 (that includes the logical lock module 233) and the network switch 210.

In other examples, the logical lock module 233 can provide an unauthorized entry signal to the security server 240 (or other server) via the network 220 indicating that the access portal 230 has been opened without authorization. In response to the unauthorized entry signal, the security server 240 can provide the breach signal to the network switch 210.

In response to receipt of the breach signal (provided from the logical lock module 233 of the electronic lock 232 or from the security server 240) the network switch 210 switches from the normal mode to the breach mode. In the breach mode, the network switch 210 disables outgoing network traffic, such that the network switch 210 prevents each mobile device 204 from outputting network traffic on the network 220. Additionally, in some examples, in the breach mode of operation, the network switch 210 also prevents network traffic from flowing from the network 220 into the R number of mobile devices 204 (identified by MAC address). Alternatively, in some examples, in the breach mode of operation the network switch 210 operates as a data diode, such that the network switch 210 allows incoming network traffic (e.g., packets from the network 220 destined for a given mobile device 204), but prevents outgoing traffic (e.g., traffic from the given mobile device 204 to a node on the network 220).

Additionally, in response to the unauthorized entry signal, the security server 240 can broadcast a breach message identifying the MAC address of each of the R number of mobile devices 204 for adding to a blacklist. Nodes on the network 220 can be configured to refuse network traffic addressed by nodes on a blacklist. In this manner, even if one of the mobile devices 204 is stolen and has a memory cleared, that mobile device 204 would still be prevented from accessing the secure data server 224 and/or other nodes on the network 220.

The logical lock module 233 is configured to continue to operate in the breach mode until a security breach clearance code is received. In some examples, the card reader 234 can include a cryptoprocessor 242 that can receive the security breach clearance code from the security server 240 (or another entity). In other examples, the cryptoprocessor 242 of the card reader 234 can be employed as an asynchronous password token generator to generate a time synchronized asynchronous password. In such a situation, entry of the keycode and the time synchronized asynchronous password on a mobile device 204 (e.g., a smart phone) or a keypad in communication with the card reader 234 can cause the logical lock module 233 to switch to the authorized mode. Additionally, the logical lock module 233 can provide the network switch 210 with the security breach clearance code or an indication that the security breach clearance code has been received. In response, the network switch 210 can switch back to the normal mode of operation.

The system 200 can thwart and/or imped attempts by an unauthorized user (e.g., a hacker and/or a terrorist) to infiltrate the network 220, particularly private information stored on the secure data server 224. In particular, once the unauthorized user forces open the access portal 230 (without using the keycard 235), the network switch 210 switches to the breach mode to prevent the R number of mobile devices 204 from accessing the secure data server 224. Accordingly, the harm caused by the unauthorized user is limited to the contents of the secure container 202 (e.g., the R number of mobile devices 204).

Figure 4:
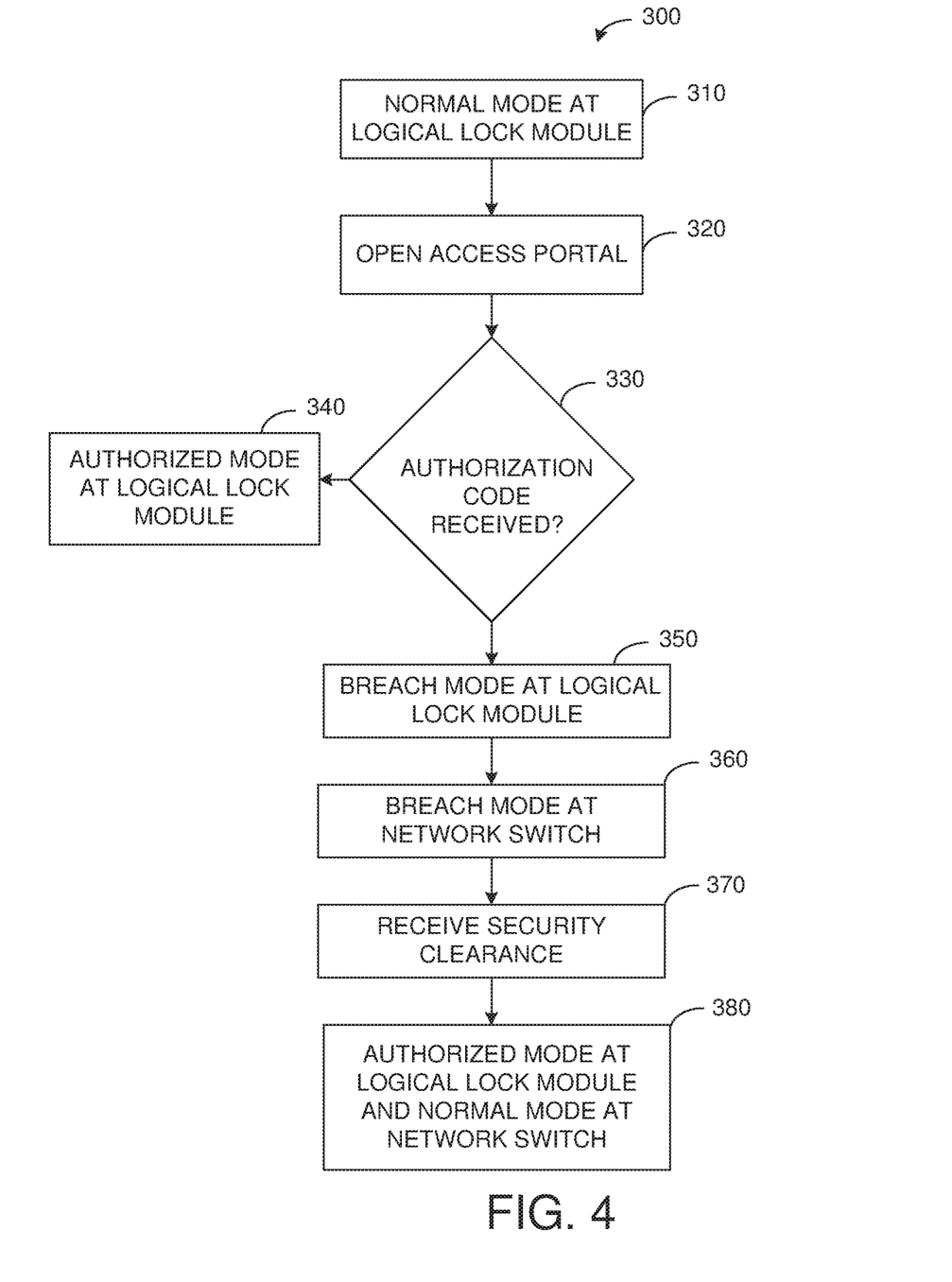
FIG. 4 illustrates a flowchart of an example method for thwarting and/or impeding attempts by an unauthorized user (e.g., a hacker and/or a terrorist) to infiltrate a network.

In view of the foregoing structural and functional features described above, an example method will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flow diagram of an example method 300 for thwarting and/or impeding unauthorized network infiltration by an unauthorized user (e.g., a hacker and/or a terrorist). The method 300 can be executed by a system with a secure container, such as the system 50 with the secure container 52 of FIG. 1, the system 100 with the S number of secure containers 102 of FIG. 2 and/or system 200 with the secure container 202. At 310, a logical lock module (e.g., the logical lock module 60 of FIG. 1) can be switched to a normal mode of operation in response to a signal from a security checkpoint (e.g., the security checkpoint 56 of FIG. 1) that monitors a state of an access portal for the secure container indicating that the access portal is closed. The logical lock module can remain in the normal state as long as the signaling from the security checkpoint indicates that the access portal is closed.

At 320, the a sensor (e.g., the sensor 58 of FIG. 1) associated with the security checkpoint 56 of FIG. 1 can detect that an access portal (e.g., the access portal 54 of FIG. 1) has been opened, and the security checkpoint provides signaling to the logical lock module indicating that the access portal has been opened. At 330, a determination can be made by the logical lock module as to whether an authorization code has been received at the security checkpoint (indicating in signaling from the security checkpoint). If the determination at 330 is positive (e.g., YES), the method 300 can proceed to 340. If the determination at 330 is negative (e.g., NO), the method 300 can proceed to 350. At 340, the logical lock module can switch to an authorized mode of operation, indicating that the access portal is permitted to be opened or closed. Additionally, it is understood that in some examples, the determination at 330 can be made prior to the opening of the access portal.

At 350, the logical lock module switches to a breach mode of operation. In some examples, in the breach mode of operation, the logical lock module sends a breach signal to a network switch (e.g., the network switch 62 of FIG. 1). In other examples, the logical lock module sends an unauthorized entry signal to a security server (e.g., the security server 72 of FIG. 1) (or other external entity) in response to switching to the breach mode of operation, and the security server sends the breach signal to the network switch.

In response to receipt of the breach signal, at 360, the network switch switches to a breach mode of operation. In the breach mode of operation, the network switch prevents terminal devices (e.g., the K number of terminal devices 66 of FIG. 1) from sending network traffic on a network by disabling outgoing communication on communication ports of the network switch. At 370, the security checkpoint receives a security breach clearance code and provides signaling for the clearance code to the logical lock module. At 380, in response, the logical lock module switches to the authorized mode, and commands and causes the network switch to switch back to the normal mode.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for preventing unauthorized access to a network, the system comprising:
   a secure container comprising:
     an access portal for controlling access to contents of the secure container;
     a security checkpoint configured to determine a state of the access portal and to receive an authorization code for opening the access portal; and
     a logical lock module that switches to a breach mode of operation in response to a signal from the security checkpoint indicating that the access portal has been opened without receipt of the authorization code within a predetermined amount of time;
   a network switch disposed within the secure container, wherein the network switch is configured to:
     communicate on a network; and
     disable outgoing network communications to the network in response to a breach signal indicating that the logical lock module has switched to the breach mode; and
   a terminal device disposed within the secure container, the terminal device communicating on the network through the network switch.

2. The system of claim 1, wherein the logical lock module is integrated with the network switch, and the logical lock module provides the breach signal to the network switch in response to the access portal being opened without the authorization code.

3. The system of claim 1, wherein the logical lock module provides an unauthorized entry signal to a security server operating on the network in response to the access portal being opened without the authorization code, and the security server provides the breach signal to the network switch in response to the unauthorized entry signal.

4. The system of claim 3, wherein the security server broadcasts a breach message to nodes on the network identifying a media access control (MAC) address for the terminal device in response to receipt of the unauthorized entry signal.

5. The system of claim 1, wherein the security checkpoint is a keypad to allow entry of the authorization code.

6. The system of claim 5, wherein opening of the access portal without entry of the authorization code on the keypad causes the logical lock module to send the breach signal to the network switch.

7. The system of claim 1, wherein the logical lock module continues to operate in the breach mode until a security breach clearance code is received.

8. The system of claim 7, wherein the security checkpoint comprises a cryptoprocessor for generating a portion of the security breach clearance code or for decrypting a portion of the security breach clearance code that is provided from a server via the network.

9. The system of claim 1, wherein the security checkpoint receives a signal from a sensor indicating a state of the access portal.

10. The system of claim 1, wherein security checkpoint is a card reader for receiving the authorization code from a keycard in close proximity with the card reader.

11. The system of claim 1, wherein the secure container is a control panel affixed to a wind turbine in a windfarm, and the access portal is a door of the control panel.

12. The system of claim 1, wherein the terminal device communicates with the network switch through a wireless communication channel.

13. The system of claim 12, wherein the terminal device is configured to communicate with a server coupled to the network through a secure communication channel, wherein the secure communication channel includes the wireless communication channel between the network switch and the terminal device.

14. The system of claim 1, wherein the network switch allows incoming communication in response to the breach signal.

15. The system of claim 1, wherein the terminal device comprises a plurality of terminal devices, wherein a first terminal device of the plurality of terminal devices comprises a programmable logic controller and a second terminal device of the plurality of terminal devices comprises a user terminal.

16. A system preventing unauthorized access to a network comprising:
a plurality of secure containers, each secure container comprising:
an access portal for controlling access to contents of the respective secure container;
a security checkpoint configured to receive an authorization code for access to the contents of the respective secure container and to determine a state of the access portal for the respective container; and
a logical lock module that switches to a breach mode of operation in response to a signal from the security checkpoint indicating that the access portal has been opened without receipt of the authorization code within a predetermined amount time before or after opening the access portal;
a plurality of network switches, each network switch being disposed within a respective secure container, wherein each network switch is configured to:
communicate on a network; and
disable outgoing network communications to the network in response to a breach signal indicating that a respective logical lock module has switched to the breach mode; and
a plurality of terminal devices, wherein each terminal device is disposed within a respective secure container, and each terminal device communicates on the network through a respective network switch.

17. The system of claim 16, wherein each secure container is a control panel affixed to a wind turbine of a windfarm.

18. The system of claim 16, wherein each control panel has at least two of the plurality of terminal devices disposed therein.

19. A method for impeding infiltration of a network, the method comprising:
monitoring, by a security checkpoint, a state of an access portal of a secure container, wherein the security checkpoint includes an interface for receiving an authorization code;
determining, by a logical lock module, that the access portal of the secure container has been opened without entry of the authorization code in response to a signal from a security checkpoint indicating that the secure container has been opened and in the absence of receiving the authorization code from the security checkpoint with a predetermined amount of time; and
disabling, by a network switch disposed within the secure container, outgoing network traffic to a network in response to a breach signal indicating that the access portal has been opened without entry of the authorization code, wherein a terminal device is coupled to the network switch, such that outgoing communications for the terminal device to the network are disabled.

20. The method of claim 19, wherein the logical lock module is integrated with the network switch, and the logical lock module provides the network switch the breach signal.

* * * * *